United States Patent Office 2,792,397
Patented May 14, 1957

2,792,397

QUINAZOLINE-AMINO-ANTHRAQUINONE DYESTUFFS

Friedrich Ebel, Mannheim-Feudenheim, and Rudolf Randebrock and Walter Rupp, Ludwigshafen (Rhine)-Oppau, Germany, assignors to Badische Anilin- & Soda-Fabrik Aktiengesellschaft, Ludwigshafen (Rhine), Germany No Drawing. Application May 25, 1955,
Serial No. 511,121

Claims priority, application Germany June 1, 1954

8 Claims. (Cl. 260—256.5)

This invention relates to a process for the production of new and valuable vat dyestuffs.

We have found that valuable vat dyestuffs are obtained by reacting 2 mols of identical or different water-insoluble amines of the anthroquinone series with 1 mol of a 2,4-dihalogenquinazoline containing in the molecule a sulfonamido group or a trifluoromethyl group and if desired one or more further halogen atoms.

Suitable amines of the anthraquinone series are for example 1- or 2-aminoanthroquinone, 1-amino-4-, -5-, -6- or -7-chloranthraquinone, 1-amino-4-methoxyanthraquinone, 1-amino-4- or -5-aroylaminoanthraquinones, 1,4- or 1.5-diamino-2-acetyl- or -2-formylanthraquinone, 3-trifluoromethyl-7-amino-5.6-phthaloylacridone or 2.4-dichlor-7-amino-5.6-phthaloylacridone.

Among usable quinazolines of the said kind there may be mentioned 2.4-dichlorquinazoline-6-sulfodimethylamide, 2.4-dichlorquinazoline-6-sulfomethylanilide, 2.4.6-trichlorquinazoline-8-sulfomethylamide, as well as the corresponding 2.4-dibromoquinazolines, and 2.4-dichlor- or 2.4-dibrom-7-trifluormethylquinazoline.

The reaction is preferably carried out by heating 2 mols of one of the said amines and 1 mol of said quinazolines in the presence of an inert organic solvent, such as nitrobenzene, dichlorbenzene or trichlorbenzene, to 70° to 250° C., preferably to 100° to 200° C., and separating the deposited dyestuff from the cooled reaction mixture. The co-employment of an acid-binding agent, such as sodium acetate, potassium carbonate or pyridine, is not essential but in many cases its addition facilitates the reaction. Especially valuable dyestuffs are obtained by first reacting 1 mol of one of the said quinazolines with 1 mol of an amine of the said kind and then reacting the product formed with a further mol of another amine of the said kind. Mixed substituted quinazolines are thus obtained.

The dyestuffs thus obtainable are suitable for the dyeing of natural or regenerated cellulose and also polyamide fibres from the vat. Clear and very fast shades of color are thus obtained.

The following examples will further illustrate this invention but the invention is not restricted to these examples. The parts are parts by weight.

*Example 1*

A mixture of 13.8 parts of 2.4-dichlorquinazoline-6-sulfodimethylamide, 24 parts of 1-amino-5-benzoylaminoanthraquinone and 450 parts of nitrobenzene is heated to 160° C. for 5 hours while stirring. After cooling, the deposited dyestuff is filtered off by suction, washed with methanol and dried. 21.5 parts of the new dyestuff are thus obtained in the form of red-orange needles which dye cotton clear orange shades of very good fastness properties from an olive vat.

With 1-amino-4-benzoylaminoanthraquinone instead of 1-amino-5-benzoylaminoanthraquinone there are obtained in the same way compact ruby-red crystals which dye cotton clear fast ruby-red shades from an olive vat.

The 2.4-dichlor-6-sulfodimethylaminoquinazoline can be prepared as follows:

2.4-dihydroxyquinazoline is converted by means of chlorsulfonic acid at 140° C. into the correspoding sulfochloride. The latter is converted into the sulfodimethylamide by treatment with dimethylamine by known methods. A mixture of 100 parts of the 2.4-dihydroxyquinazoline-6-sulfodimethylamide, 300 parts of phosphorus pentachloride and 600 parts of phosphorus oxychloride is heated for 3 hours to boiling and the phosphorus oxychloride distilled off from the reaction mixture. After recrystallizing the residue from 300 parts of acetonitrile, 74 parts of 2.4-dichlorquinazoline-6-sulfodimethylamide are obtained in compact, colorless crystals of the melting point 161° to 162° C. Further amounts can be recovered by concentrating the mother liquor.

*Example 2*

A mixture of 27.2 parts of 1-amino-5-benzoylaminoanthraquinone, 14.8 parts of 2.4-dichlorquinazoline-6-sulformethylanilide and 400 parts of nitrobenzene is heated at 150° C. for 6 hours while stirring. After the usual working up, 27.0 parts of a red-brown dyestuff are obtained which dyes cotton very fast orange shades from a red-brown vat.

If the 1-amino-5-benzoylaminoanthraquinone is replaced by 1-amino-4-benzoylaminoanthraquinone, a dyestuff is obtained which dyes cotton clear ruby-red shades of very good fastness properties from a ruby-red vat.

The 2.4-dichlorquinazoline-6-sulfomethylanilide is obtained in a manner corresponding to the statements in Example 1, paragraph 3, the dimethylamine being replaced by monomethylaniline. It forms compact, colorless crystals (from acetonitrile) of the melting point 168° to 169° C.

*Example 3*

A mixture of 23 parts of 2.4-dichlorquinazoline-6-sulfodimethylamide, 26 parts of 2-aminoanthraquinone and 750 parts of nitrobenzene is heated at 180° C. for 2½ hours while stirring. After the usual working up, 36 parts of the new dyestuff are obtained in the form of brownish leaflets, which dye cotton very fast, clear yellow shades from a red vat.

If the 2.4-dichlorquinazoline-6-sulfodimethyl-amide is replaced by 2.4-dichlorquinazoline-6-sulfomethylanilide, olive-yellow leaflets are obtained which dye cotton very fast yellow shades from a red vat. With 1-aminoanthraquinone a dyestuff is obtained which dyes cotton very fast yellow-orange shades from a red-brown vat.

*Example 4*

A mixture of 51 parts of 1-amino-5-chloranthraquinone, 37 parts of 2.4-dichlorquinazoline-6-sulfomethylanilide and 1200 parts of nitrobenzene is heated at 130° C. for 2 hours while stirring. After the usual working up, a dyestuff is obtained in the form of red needles, which dyes cotton fast orange shades from a brown vat.

In corresponding manner, an orange dyestuff which dyes cotton orange shades from a red-brown vat is obtained from 1-amino-6-chloranthraquinone and 2.4-dichlorquinazoline-6-sulfodimethylamide.

*Example 5*

A mixture of 23 parts of 2.4-dichlorquinazoline-6-sulfodimethylamide, 30 parts of 1-amino-4-methoxyanthraquinone and 750 parts of nitrobenzene is heated at 110° C. for 7 hours while stirring. After the usual working up of the reaction mixture, 38.0 parts of a dyestuff are obtained which dyes cotton brilliant neutral-red shades of very good fastness properties from a brown-red vat, In the same way with 2.4-dichlorquinazoline-6-sulfomethylanilide there is obtained a dyestuff in the form of brick colored needles which dyes cotton neutral red shades of great fastness from a brown vat.

*Example 6*

68 parts of 1-amino-5-benzoylaminoanthraquinone and 34 parts of 2.4.6-trichlorquinazoline-8-sulfodimethylamide are introduced simultaneously while stirring into 1000 parts of nitrobenzene at 140° to 150° C. and the whole is then further stirred for 6 hours at 150° C. After the usual working up, 65 parts of the new dyestuff are obtained in the form of red needles which dye cotton very fast brilliant orange shades from a brown vat.

If the 1-amino-5-benzoylaminoanthraquinone is replaced by equivalent amounts of 1-amino-4-benzoylaminoanthraquinone, a dyestuff in the form of red needles is obtained which dyes cotton very fast ruby-red shades from an olive vat.

The 2.4.6-trichlorquinazoline-8-sulfodimethylamide is obtained in the following way:

2.4-dihydroxy-6-chlorquinazoline is treated with chlorsulfonic acid at 140° C. The sulfochloride formed is reacted with dimethylamine. 45 parts of the resultant 2.4-dihydroxy-6-chlor quinazoline-8-sulfodimethylamide are heated to boiling for 3½ hours with 120 parts of phosphorus pentachloride and 250 parts of phosphorus oxychloride. The phosphorus oxychloride is then distilled off and the residue recrystallized from 120 parts of acetonitrile. There are thus obtained 28 parts of compact almost colorless crystals of the melting point 154° to 155° C. Further amounts may be recovered from the mother liquor by concentration.

*Example 7*

A mixture of 51 parts of 1-amino-4-methoxyanthraquinone, 34 parts of 2.4.6-trichlorquinazoline-8-sulfodimethylamide and 1000 parts of nitrobenzene is heated at 110° C. for 7 hours while stirring. After the usual working up, 51.2 parts of the new dyestuff are obtained in the form of red needles which dye cotton very fast brilliant red shades from a red-brown vat.

*Example 8*

A mixture of 44 parts of 2-aminoanthraquinone, 34 parts of 2.4.6-trichlorquinazoline-8-sulfodimethylamide and 1000 parts of nitrobenzene is heated to 160° C. for 5 hours while stirring. After the usual working up, 60 parts of the new dyestuff are obtained in the form of compact yellow crystals which dye cotton very fast brilliant yellow shades from a brown-red vat.

If the 2-aminoanthraquinone be replaced by 1-aminoanthraquinone, a dyestuff is obtained in the form of orange needles which dye cotton very fast clear golden-orange shades from a brown red vat.

*Example 9*

A mixture of 27 parts of 2.4-dichlor-7-trifluoromethylquinazoline, 44 parts of 2-aminoanthraquinone and 1000 parts of nitrobenzene is heated at 180° C. for 2 hours while stirring. After cooling the reaction mixture to 60° C., the deposited dyestuff is filtered off by suction, washed with methanol and dried. 50 parts of a microcrystalline yellow dyestuff are obtained which dyes cotton clear yellow shades from a red-brown vat.

If the 2-aminoanthraquinone be replaced by 1-aminoanthraquinone, a dyestuff is obtained which dyes cotton very fast yellow-orange shades from a red-brown vat.

The 2.4-dichlor-7-trifluoromethylquinazoline can be prepared in the following way:

A mixture of 50 parts of 2-amino-4-trifluoromethylbenzoic acid and 100 parts of urea is heated for about 50 minutes at 165° to 175° C. After cooling the melt, the excess urea is dissolved out with water, whereby 45 parts of 2.4 - dihydroxy - 7 - trifluoromethylquinazoline (melting point above 300° C.) remain. This is heated with 110 parts of phosphorus pentachloride and 200 parts of phosphorus oxychloride for 3 hours at 105° C., the phosphorus oxychloride is distilled off and the resultant 2.4-dichlor-7-trifluoromethylquinazoline distilled in vacuo (boiling point 123° to 125° C. at 9 Torr.; it forms compact colorless crystals of melting point 79° C.).

*Example 10*

A mixture of 27 parts of 2.4-dichlor-7-trifluoromethylquinazoline, 68 parts of 1-amino-5-benzoylaminoanthraquinone and 1000 parts of nitrobenzene is heated at 150° C. for 6 hours while stirring. After cooling, the deposited dyestuff is filtered off by suction and washed with methanol. After drying there are obtained 64 parts of an orange colored compound which dyes cotton powerful brilliant orange shades from a brown-violet vat.

In the same way, with 1-amino-5-chloranthraquinone or with 1-amino-6-chloranthraquinone, orange-colored compounds are obtained which both dye cotton brilliant orange shades from red brown vats.

*Example 11*

A mixture of 51 parts of 1-amino-4-methoxyanthraquinone, 27 parts of 2.4 - dichlor - 7 - trifluoromethylquinazoline and 1000 parts of nitrobenzene is heated at 110° C. for 7 hours while stirring. It is then allowed to cool and the deposited dyestuff filtered off by suction and washed with methanol. After drying, 58 parts of brown-red crystals are obtained which dye cotton beautiful red shades with very good fastness properties from an orange vat.

*Example 12*

A mixture of 68 parts of 1-amino-4-benzoylaminoanthraquinone, 27 parts of 2.4-dichlor-7-trifluoromethylquinazoline and 1000 parts of nitrobenzene is heated at 150° C. for 6 hours while stirring. The reaction mixture is then allowed to cool and the deposited dyestuff is filtered off by suction and dried. 66 parts of brownish-red crystals are obtained which dye cotton ruby-red shades with very good fastness properties from a brown-violet vat.

*Example 13*

A mixture of 13.5 parts of 2.4-dichlor-7-trifluoromethylquinazoline, 41 parts of 3-trifluoromethyl-7-amino-5.6-phthaloylacridone and 750 parts of nitrobenzene is heated at 185° C. for 3 hours while stirring. After cooling to 60° C., the deposited dyestuff is filtered off by suction, washed with methanol and dried. 25 parts of the dry dyestuff are obtained in the form of blue-green needles. It dyes cotton very fast powerful greenish-blue shades from a violet vat.

*Example 14*

A mixture of 27 parts of 2.4-dichlor-7-trifluoromethylquinazoline, 50 parts of 1.4-diamino-2-acetyl-anthraquinone and 1000 parts of nitrobenzene is heated at 180° C. for 2 hours while stirring. After cooling to 60° C., the resultant dyestuff is filtered off by suction, washed with methanol and dried. 56 parts of the new dyestuff are obtained in the form of blue needles. It dyes cotton clear blue shades with very good fastness properties from an olive vat.

*Example 15*

A mixture of 3.6 parts of 2.4-dichlorquinazoline-6-sulfonic acid dimethylamide, 5.6 parts of 1.4-diamino-2-acetylanthraquinone and 100 parts of nitrobenzene is stirred for 2 hours at 180° C. The reaction mixture is filtered by suction at 60° C. and, after washing with methanol and drying, 6.5 parts of blue needles of the new dye stuff are obtained. The color of its solution in sulfuric acid is yellow-brown. It dyes cellulose and polyamide fibres a blue color from a brown-olive vat.

Example 16

40 parts of 2.4-dichlorquinazoline-6-sulfonic acid methylanilide, 40 parts of 1-aminoanthraquinone, 40 parts of phenol and 1000 parts of toluene are stirred for 12 hours at 70° C. The reaction mixture is allowed to cool overnight and the precipitate filtered off by suction and washed with benzene and then with cyclohexane. 65 parts of 2-chlor-4-(anthraquinonyl-(1')-)-aminoquinazoline-6-sulfonic acid methylanilide are obtained in the form of yellow needles.

55 parts of this intermediate product and 34 parts of 1-amino-4-benzoylaminoanthraquinone are stirred in 1000 parts of nitrobenzene for 6 hours at 150° C. It is allowed to cool, filtered by suction, washed with methanol and dried. 58 parts of a red-brown powder are obtained which dyes cotton fast red-brown shades from a red vat.

If the 1-amino-4-benzoylaminoanthraquinone is replaced by 1-amino-5-benzoylaminoanthraquinone, a dyestuff giving red-orange dyeings is obtained.

Example 17

40 parts of 1-aminoanthraquinone, 40 parts of 2.4-dichlor-7-trifluormethylquinazoline, 80 parts of phenol and 1000 parts of toluene are heated at 70° C. for 7 hours. After cooling, the precipitate is filtered off by suction, washed with benzene and dried. 81 parts of 2-chlor-7-trifluoromethyl - 4 - (anthraquinonyl-(1')-)-aminoquinazoline are obtained in the form of yellow needles.

45 parts of this intermediate product and 28 parts of 1.4-diamino-2-acetylanthraquinone are heated in 1000 parts of nitrobenzene at 180° C. for 2 hours. The reaction mixture is then allowed to cool to 100° C. and the precipitate is filtered off by suction and washed with methanol. 25 parts of grey-violet needles are obtained. The dyestuff dyes cotton fast grey shades from an olive vat.

Similar gray shades are obtained by using corresponding amounts of 2.4-dichlor-7-amino-5.6-phthaloylacridone instead of the 1.4-diamino-2-acetylanthraquinone.

What we claim is:

1. A process for the production of vat dyestuffs which comprises heating to about 70° to 250° C. a quinazoline derivative of the general formula

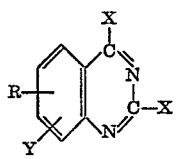

in which X represents a halogen atom selected from the group consisting of bromine and chlorine, R represents a member of the group consisting of SO₂NHCH₃, SO₂N(CH₃)₂, SO₂NHC₆H₅ and CF₃ groups, and Y represents a member of the group consisting of hydrogen and chlorine, with an amine of the anthraquinone series selected from the group consisting of 1-and 2-aminoanthraquinones and their C-monochloro-substitution products, 1-amino-4-methoxyanthraquinone, 1-amino-4- and 5-benzoylaminoanthraquinones, 1.4- and 1.5-diamino-2-formyl- and -2-acetylanthraquinones, 3-fluoromethyl- and 2.4-dichlor-7-amino-5.6-phthaloylacridones.

2. A process for the production of vat dyestuffs which comprises heating to about 70° to 250° C. a quinazoline derivative of the general formula

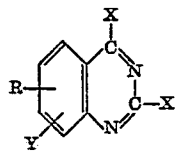

in which X represents a halogen atom selected from the group consisting of bromine and chlorine, R represents a member of the group consisting of $SO_2NHCH_3$, $SO_2N(CH_3)_2$, $SO_2NHC_6H_5$ and $CF_3$ groups, and Y represents a member of the group consisting of hydrogen and chlorine, with an amine of the anthraquinone series selected from the group consisting of 1- and 2-aminoanthraquinones and their C-monochloro-substitution products, 1-amino-4-methoxyanthraquinone, 1-amino-4- and 5-benzoylaminoanthraquinones, 1.4- and 1.5-diamino-2-formyl- and -2-acetylanthraquinones, 3-fluoromethyl- and 2.4-dichlor-7-amino-5.6-phthaloylacridones in the presence of an acid-binding reagent selected from the group consisting of alkalimetal carbonates and acetates and pyridine.

3. Vat dyestuffs of the general formula

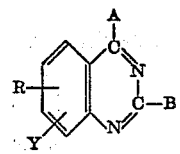

wherein R represents a member of the group consisting of $SO_2NHCH_3$, $SO_2N(CH_3)_2$, $SO_2NHC_6H_5$ and $CF_3$ groups, Y represents a member of the group consisting of hydrogen and chlorine, and A and B represent the radicals of amines of the anthraquinone series selected from the group consisting of 1- and 2-amino-anthraquinones and their C-monochloro-substitution products, 1-amino-4-methoxyanthraquinone, 1-amino-4- and 5-benzoylaminoanthraquinones, 1.4- and 1.5-diamino-2-formyl- and -2-acetylanthraquinones, 3-fluoro-methyl- and 2.4-dichlor-7-amino-5.6-phthaloylacridones, said radicals being connected by their amino groups with said quinazoline ring.

4. The vat dyestuff of the formula

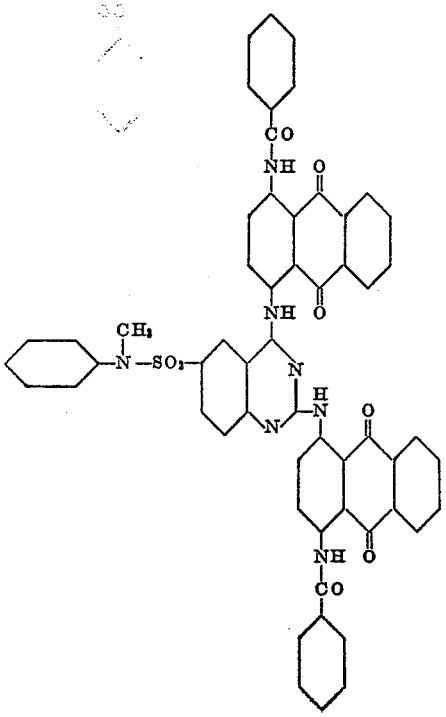

5. The vat dyestuff of the formula
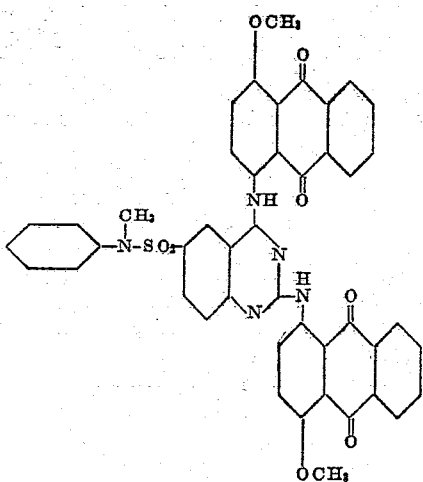
6. The vat dyestuff of the formula
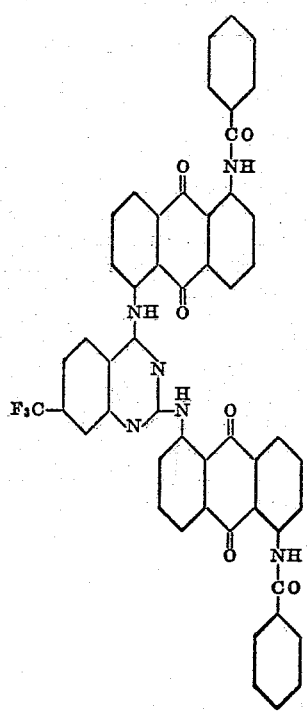
7. The vat dyestuff of the formula
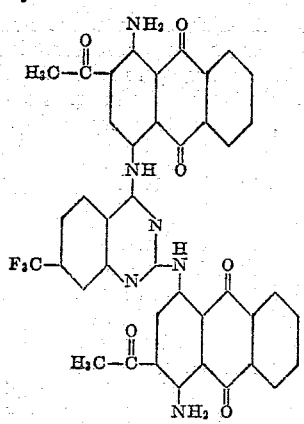
8. The vat dyestuff of the formula
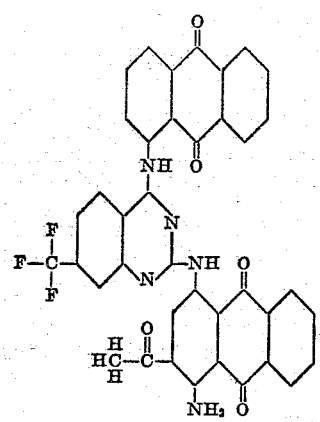
No references cited.